(12) United States Patent
Benda et al.

(10) Patent No.: US 6,241,562 B1
(45) Date of Patent: Jun. 5, 2001

(54) DIGITAL CROSS CONNECT/ INTERCONNECT MODULE

(75) Inventors: Mark Benda, Highland Lakes; David S. DeVincentis, Flanders; Michael J. Thayer, Denville, all of NJ (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/337,582

(22) Filed: Jun. 22, 1999

(51) Int. Cl.[7] .................................................. H01R 13/514
(52) U.S. Cl. ......................... 439/731; 439/668; 439/76.1
(58) Field of Search ............................. 439/61, 76.1, 79, 439/668, 731, 354, 701

(56) References Cited

U.S. PATENT DOCUMENTS

| | | |
|---|---|---|
| 4,737,113 | 4/1988 | Hopper et al. . |
| 4,815,104 | 3/1989 | Williams et al. . |
| 5,144,533 * | 9/1992 | Annett ................................... 361/395 |
| 5,233,501 | 8/1993 | Allen et al. . |
| 5,552,962 * | 9/1996 | Feustel et al. ........................ 361/733 |
| 5,582,525 | 12/1996 | Louwagie et al. . |
| 5,685,741 * | 11/1997 | Dewey et al. ........................ 439/668 |
| 5,882,217 | 3/1999 | Aponte et al. . |
| 5,913,701 | 6/1999 | Olson et al. . |

* cited by examiner

*Primary Examiner*—Khiem Nguyen
(74) *Attorney, Agent, or Firm*—Duane Morris & Heckscher LLP (57) ABSTRACT

A digital cross-connect module with a housing formed of two portions which slidably engage one another. One of the portions includes tabs which engage slots formed in the other portion. The two portions are formed of plastic, so the module housing is lighter and easier to produce than conventional housings. The housing contains a printed circuit board (PCB). The PCB has a first plurality of jacks adjacent the front of the housing and a second plurality of jacks adjacent the rear of the housing for cross-connecting digital signals.

30 Claims, 8 Drawing Sheets

DIGITAL CROSS CONNECT/ INTERCONNECT MODULE

FIELD OF THE INVENTION

The present invention relates to digital communication networks, and in particular, digital signal cross-connect modules for cross-connecting digital telecommunications circuits.

DESCRIPTION OF THE RELATED ART

Digital signal cross-connect (DSX) equipment plays an important part in the installation, monitoring, testing, restoring, and repairing of digital communications networks. Digital signal cross-connect modules are often used to provide cross-connections of digital signal lines at locations that are suited for testing and repairing the digital lines. For instance, many telephone service providers' central offices have digital signal cross-connect modules. A single DSX module generally interconnects two telecommunications apparatuses of a telecommunications network. The module is typically mounted in a rack or bank with similar modules, the bank forming a digital signal cross-connect unit (DSX unit). The DSX modules provide a point of access to the digital signals being transmitted over the digital lines of the telecommunications network, yet appear as almost invisible to the rest of the network. By utilizing the DSX modules, an operator can monitor, test and repair the digital equipment which is used by the telecommunications network without significantly interfering with the transmission of signals.

One type of digital signal cross-connect module known in the art is the Type 440IS module, produced by Lucent Technologies. The Type 440IS module is so named because it includes Type 440IS coaxial jacks, also produced by Lucent Technologies, the IS standing for "internal switch." Such a coaxial jack and associated module is described in U.S. Pat. No. 5,882,217, assigned to Lucent Technologies, the disclosure of which is incorporated herein by reference. Type 440IS modules are presently made of a seven (7) inch by five and a half (5.5) inch die cast metal case. The metal case houses a printed circuit board (PCB) which connects a first set of coaxial jacks to a second set of coaxial jacks for cross-connecting signals. Openings formed in the metal case allow the coaxial jacks on the PCB to be connected to coaxial lines. The separate portions of the metal case are secured to one another using screws or other similar attachment means. The PCB is also secured to the metal case using screws or other attachment means. Further, in order to provide isolation, insulators are often interposed between the metal housing and the elements on the PCB board. The large number of components necessary to fabricate the conventional DSX module makes the module heavy, and time consuming to manufacture(as the elements are typically screwed together by hand).

Thus, a major drawback associated with Type 440IS and other digital signal cross-connect modules is the number of parts that are associated with each module. Each module is currently formed of a die cast metal housing to which components are attached by screws and brackets. The multitude of parts makes the conventional module time-consuming to manufacture. Additionally, the conventional module is extremely heavy due to the metal casing. Hence, there is currently a need for a digital signal cross-connect module which is lighter and easier to produce and assemble.

SUMMARY OF THE INVENTION

The present invention is a digital signal cross-connect module which includes a module housing formed in two parts. The two parts may be engaged with one another to form a complete module housing, using complimentary tabs and slots on the respective parts of the housing.

The above and other advantages and features of the present invention will be better understood from the following detailed description of the preferred embodiments of the invention which is provided in connection with the accompanying drawings.

DETAILED DESCRIPTION

Figure 1:
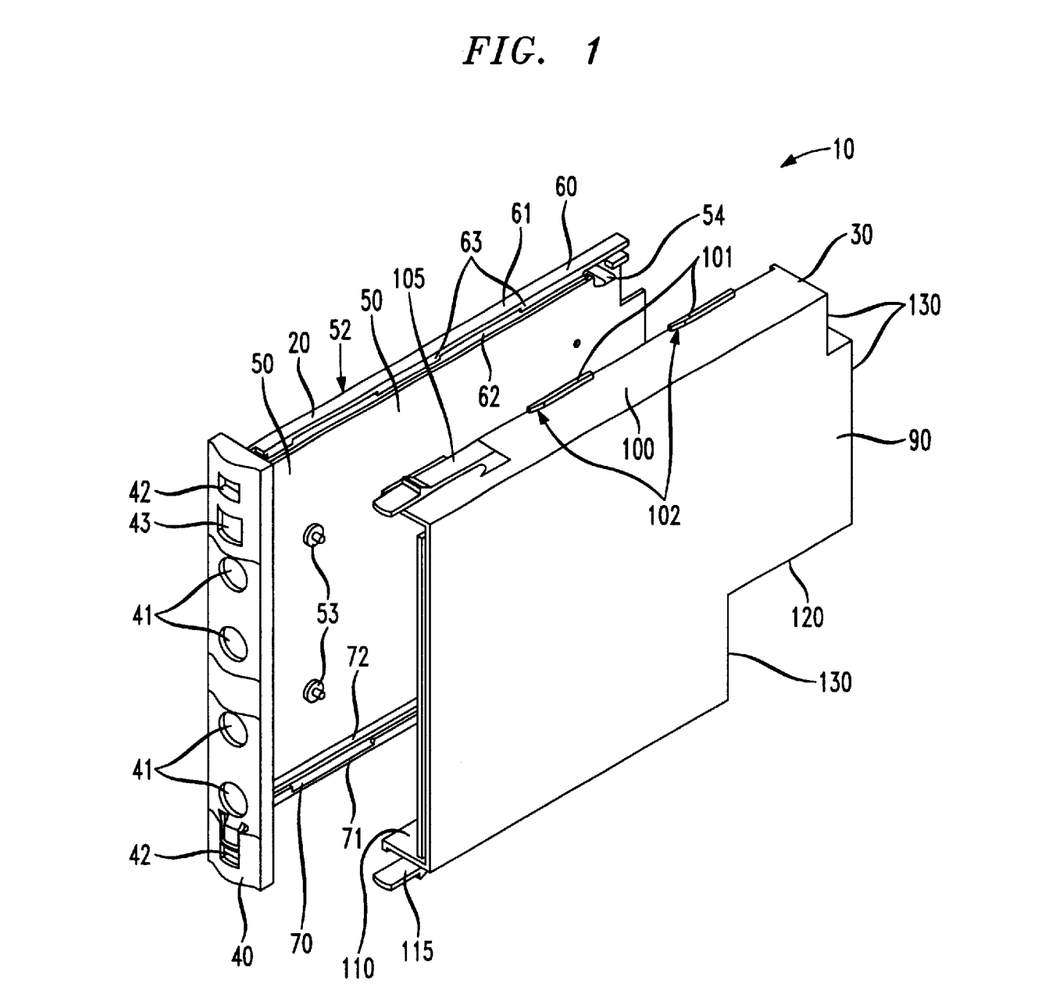
FIG. 1 is an exploded isometric view of a module housing according to the present invention.
Figure 2A:
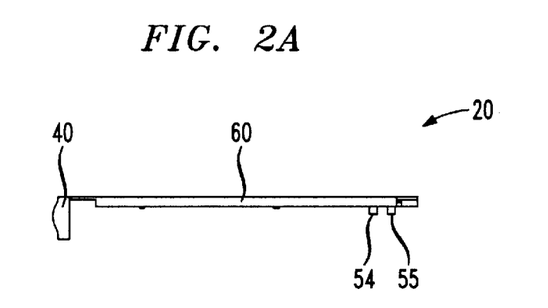
FIG. 2(a) is top plan view of a first portion of the module housing shown in FIG. 1.
Figure 2B:
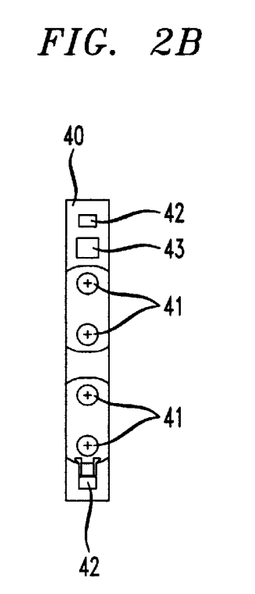
FIG. 2(b) is a front elevational view of the first portion of the module housing shown in FIG. 2(a).
Figure 2C:
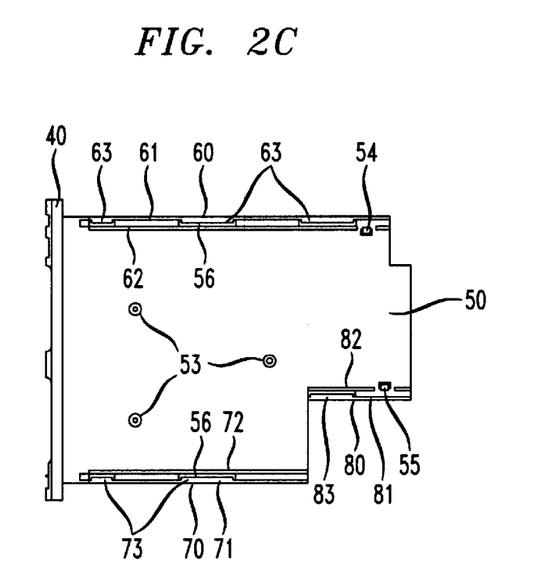
FIG. 2(c) is a right side elevational view of the first portion of the module housing shown in FIG. 2(a).

FIGS. 1, 2(a)–(c), and 3(a)–(c), show a digital cross-connect module housing 10 according to the present invention for use in digital cross-connect system. FIG. 1 shows the entire housing 10, whereas FIGS. 2(a)–(c) and 3(a)–(c) show the first portion 20 and second portion 30 of the housing, respectively. The module 10 houses a printed circuit board (PCB) which performs the cross-connecting of digital signals. The module housing 10 may be made entirely of plastic, and therefore can be much lighter than conventional module housings. Additionally, the separate portions of the module 10 are held together by slots and tabs formed around the periphery of the module housing, and therefore, the module housing 10 requires no screws or separate attachment means that could otherwise become separated from the housing portions 20, 30.

Referring to FIG. 1, the module housing 10 includes first portion 20 and second portion 30. The first portion 20 includes a front panel 40 with a plurality of openings 41–43 formed therein. Openings 41 may be for receiving coaxial connectors formed on a printed circuit board (PCB) 200, which is disposed between the first and second portions 20, 30 (see FIG. 4). Openings 42 may be for receiving tabs 105, 115 formed on the second portion 30 of the housing 10. Finally, opening 43 may receive a button 230 also formed on the PCB 200.

The first portion 20 includes a main wall 50, a top wall 60 and two bottom walls 70, 80. The top and bottom walls 60, 70, 80 extend substantially orthogonally from the main wall 50. An inner surface 51 of the main wall 50 has three pins 53 formed therein for cooperating with the PCB 200. The pins 53 fit into holes formed in the PCB to hold the PCB in place against the main wall 50. An outer surface 52 of the main wall is substantially flat, and resembles the outer surface of main wall 90 of second portion 30. The main wall 50 also includes tabs 54, 55 extending therefrom in a direction orthogonal to the main wall 50 for securing the PCB 200. The PCB 200 is inserted from above and is pressed down against the main wall 50. The tabs 54, 55 have a sloped surface and are deformable outwardly such that once the PCB is placed against the main wall 50 it cannot be easily removed.

The top and bottom walls 60, 70, 80 of the first portion 20 are all of similar construction. Each top and bottom wall 60, 70, 80 includes first 61, 71, 81 and second 62, 72, 82 sub-walls which together form slots for receiving protrusions 101, 111, 121 formed on the second portion 30 (see FIGS. 2(a)–(c)). Each of the first sub-walls 61, 71, 81 includes tabs 63, 73, 83 formed at spaced positions along the length of the wall. The tabs 63, 73, 83 are substantially rectangular-shaped and extend only from an upper portion of each wall 61, 71, 81. Each of the tabs 63, 73, 83 is disposed above substantially rectangular holes 56 formed in the main wall 50. The holes 56 become substantially aligned with the tabs 105, 115 formed in the second portion 30 when the housing 10 is closed (see FIG. 5).

Figure 3A:
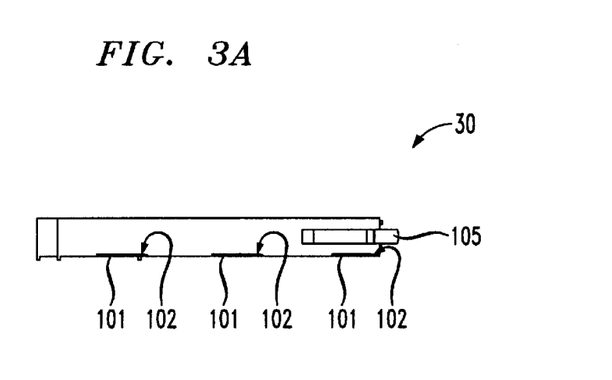
FIG. 3(a) is top plan view of a second portion of the module housing of FIG. 1.
Figure 3B:
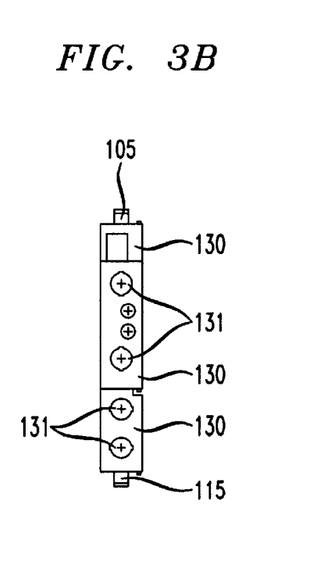
FIG. 3(b) is a rear elevational view of the second portion of the module housing shown in FIG. 3(a).
Figure 3C:
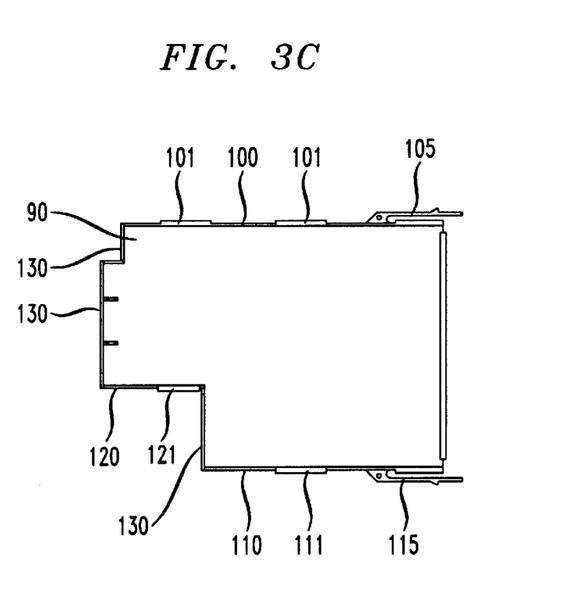
FIG. 3(c) is a right side elevational view of the second portion of the module housing shown in FIG. 3(a).

The second portion 30 of the module housing 10 includes a main wall 90, a top wall 100, two bottom walls 110, 120 and a plurality of minor sidewalls 130. The top and bottom walls 100, 110, 120 include tabs 101, 111, 121 formed at spaced positions which extend outward from the walls (see FIGS. 3(a)–(c)). The tabs 101, 111, 121 each include a ramped portion 102, 112, 122 (however only ramped portion 102 of tab 101 is shown in FIG. 3(a)) which cooperates with the tabs 63, 73, 83 formed in the first portion 20. In particular, when the first portion 20 is slidably engaged with the second portion 30, tabs 101, 111, 121 formed in the second portion slide underneath tabs 63, 73, 83 formed in the first portion. Walls 100, 110 also include tabs 105, 115 formed therein for cooperating with a module panel 300 into which the module housing 10 may be inserted (see FIGS. 6 and 7). The plurality of minor sidewalls 130 include openings 131 formed therein for allowing connection to the coaxial connectors 220 formed on the PCB 200 (see FIG. 4). The coaxial connectors 220 extend through the openings 131, and are disposed externally of the module housing 10 when the housing is assembled (see FIG. 5).

Figure 4:
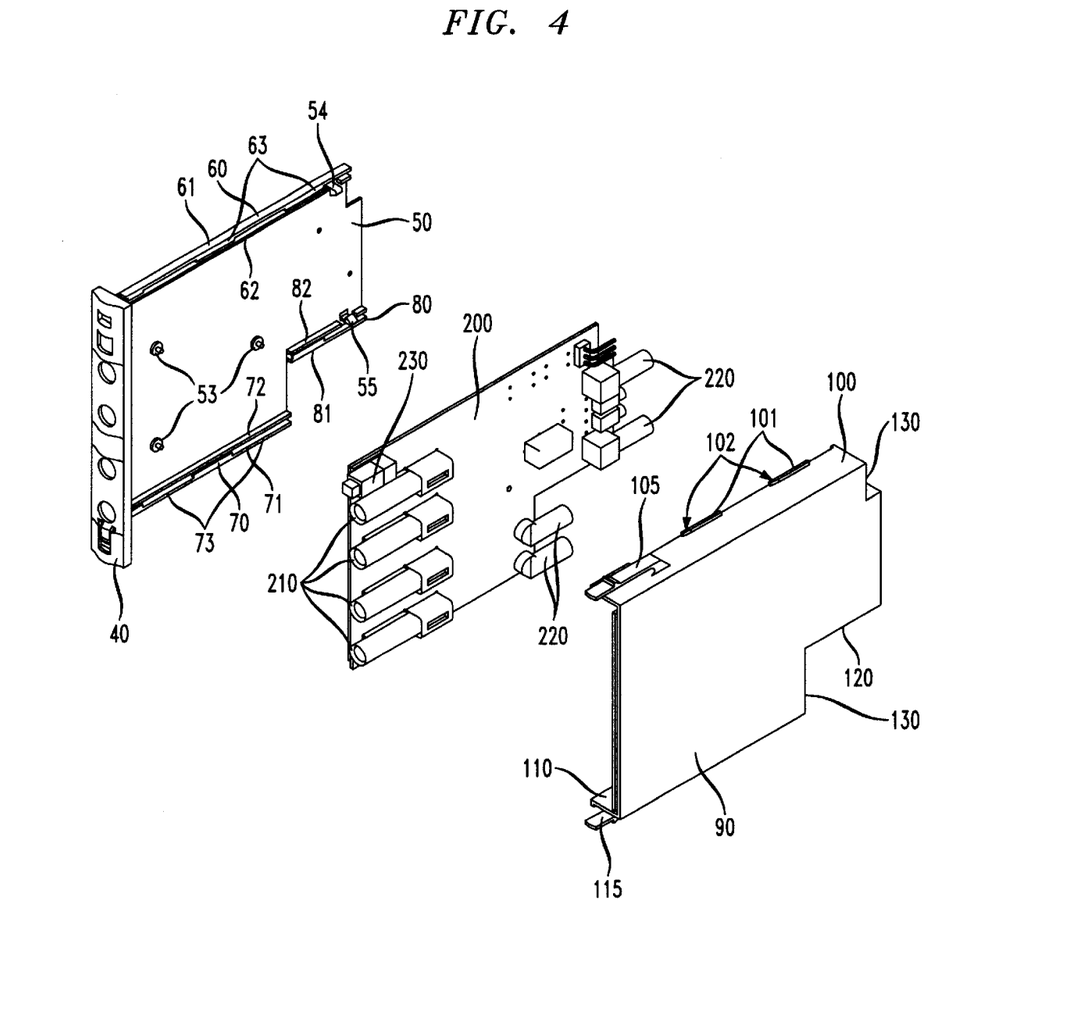
FIG. 4 is an exploded isometric view of a module according to the present invention.
Figure 5:
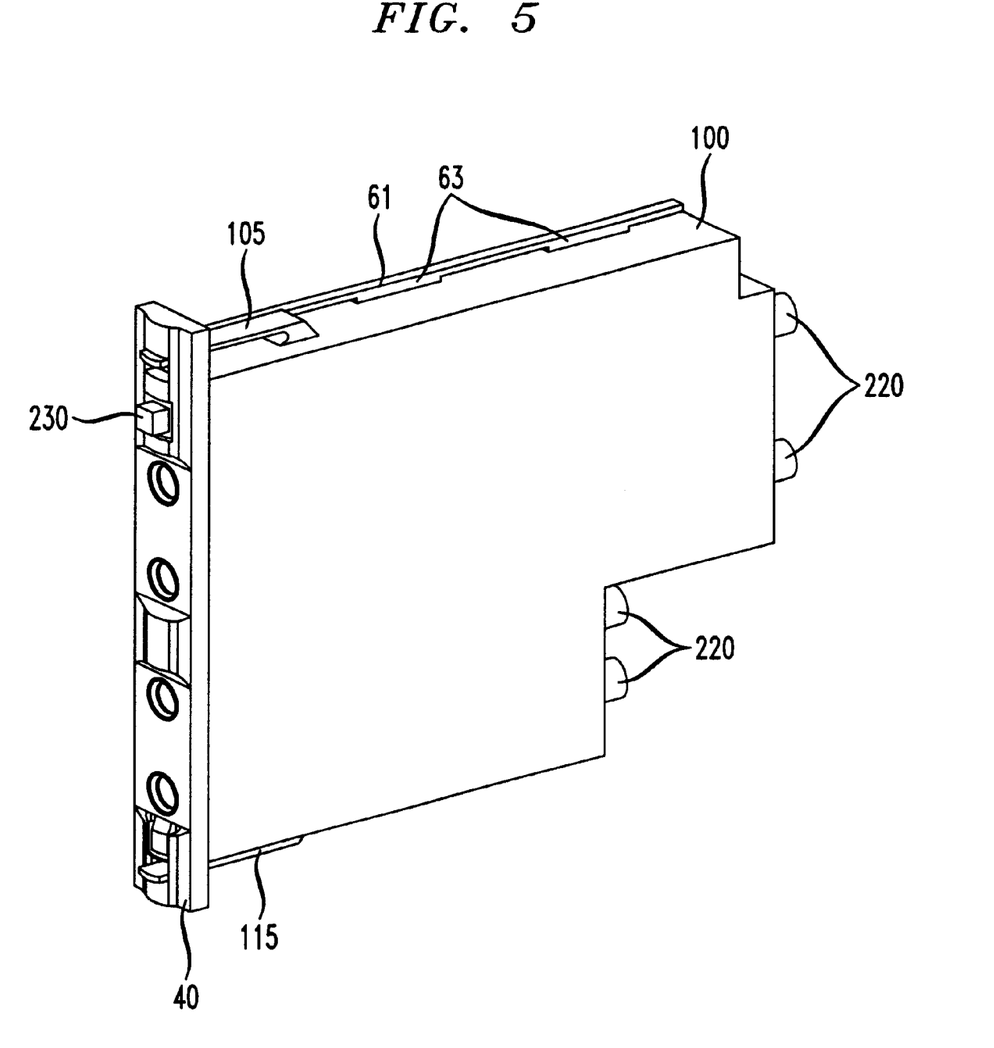
FIG. 5 is an isometric view of the module of FIG. 4 fully assembled.

FIG. 4 shows the module housing 10 of the present invention with a printed circuit board (PCB) 200 disposed between the first 20 and second 30 portions. The PCB 200 includes a first set 210 and a second set 220 of coaxial connectors which are affixed to the surface of the PCB. The first set of coaxial connectors 210 may be, for example, Type 440IS coaxial connectors which include an internal switching mechanism. The operation of these connectors is described in U.S. Pat. No. 5,882,217, assigned to Lucent Technologies, which is incorporated herein by reference. Note that each of the coaxial connectors 210 corresponds to an opening 41 formed in the front panel 40 of the module housing 10. The second set of coaxial connectors 220 may be, for example, BNC coaxial connectors which are well known in the art. As can be seen in FIG. 5, the BNC connectors 220 extend outside of the module housing 10 when the PCB 200 is placed between the first and second portions 20, 30. The BNC connectors 220 exit the housing 10 through openings 131 formed in the minor sidewalls 130 of the second portion 30. The PCB 200 also includes a trace button 230 which is used for the tracing of signals from one module to another. The trace button 230 also extends outside the housing 10 through opening 43 formed in the front panel 40 of the first portion 20.

FIG. 5 shows the module housing 10 of the exemplary embodiment of the present invention fully assembled with the PCB 200 enclosed inside. Note that the coaxial connectors 220 extend from the rear of the housing 10. Coaxial lines (not shown) may be connected to the connectors 220 to thereby couple signals to the PCB 200. The coaxial connectors 210 are aligned with openings 41 formed in the front panel 40 of the first portion 20. This alignment allows coaxial lines (not shown) to be inserted into the openings 41 to thereby connect the lines to the coaxial connectors 210 and PCB 200. It should also be noted that tabs 105, 115 and button 230 extend through respective openings 42, 43 in the front panel 40 to the exterior of the module housing 10 when the module housing is fully assembled.

Figure 6:
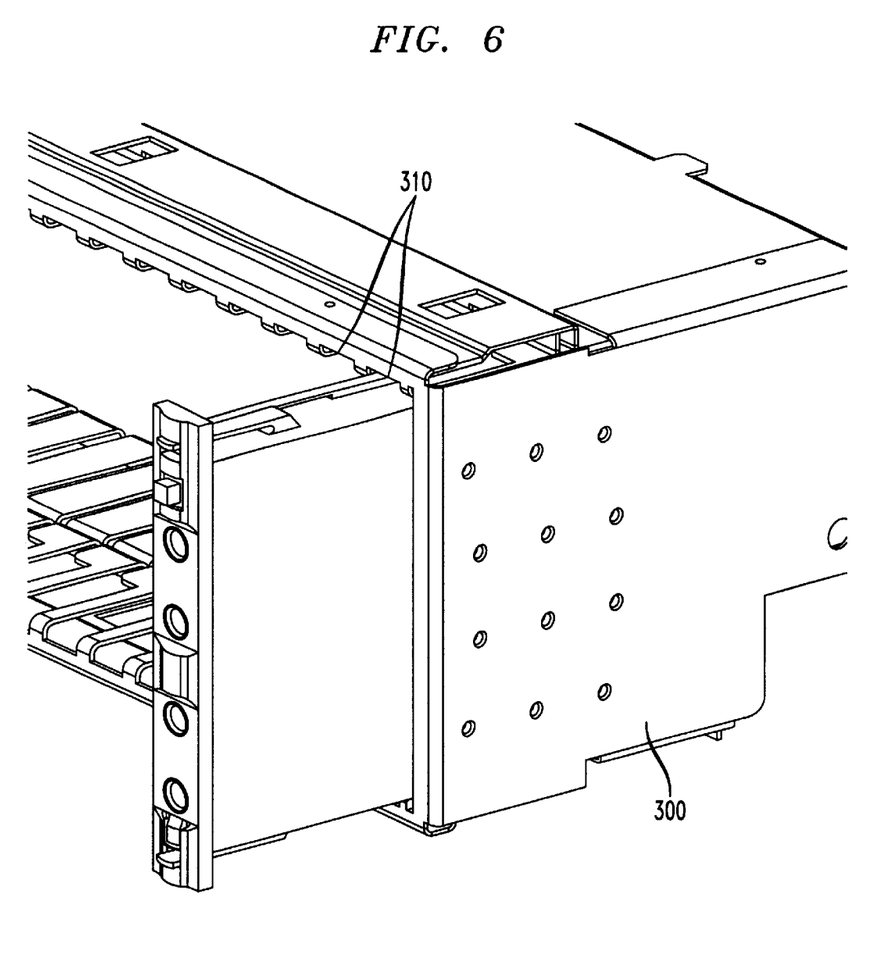
FIG. 6 shows the module of FIG. 5 partially inserted in a telecommunications panel.
Figure 7:
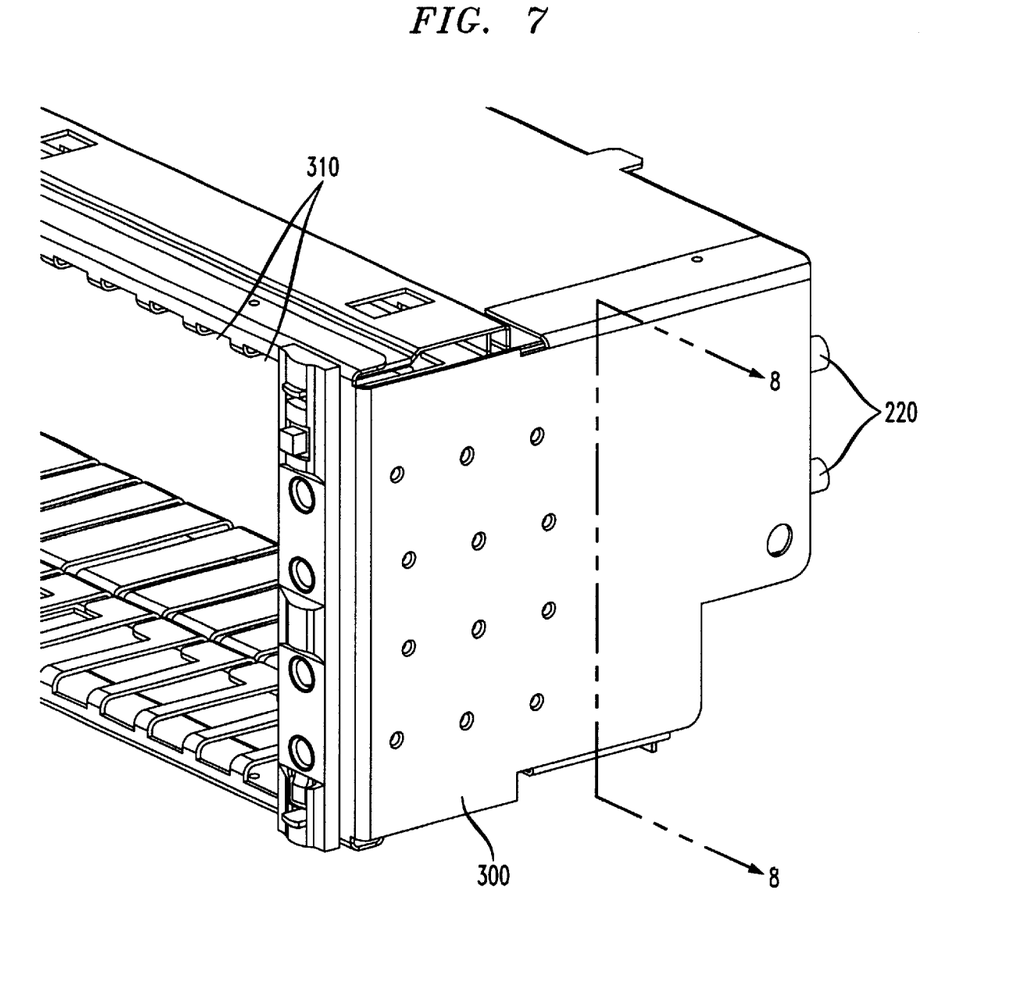
FIG. 7 shows the module of FIG. 5 completely inserted in a telecommunications panel.

FIG. 6 shows a telecommunications panel 300 into which the module housing 10 of the present invention may be inserted. The panel retains a plurality (typically 18–24) of the modules 10 and holds them in place. FIG. 7 shows the panel 300 with the module 10 fully inserted. The panel 300 includes tracks 310 which guide the modules 10 into the panel 300 and lock them in place. In particular, the tracks 310 cooperate with the tabs 105, 115 formed on the second portion 30 of the housing 10 to lock the module housings 10 into the panel. The tabs 105, 115 are deformable, and when the module housing 10 is inserted into the panel, the tabs are deformed inwardly (i.e. towards the module housing 10) until they pass protrusions 320, 330 formed in the tracks. After the tabs 105, 115 pass the protrusions 320, 330, they return to their undeformed position and thereby prevent easy removal of the modules 10.

Figure 8:
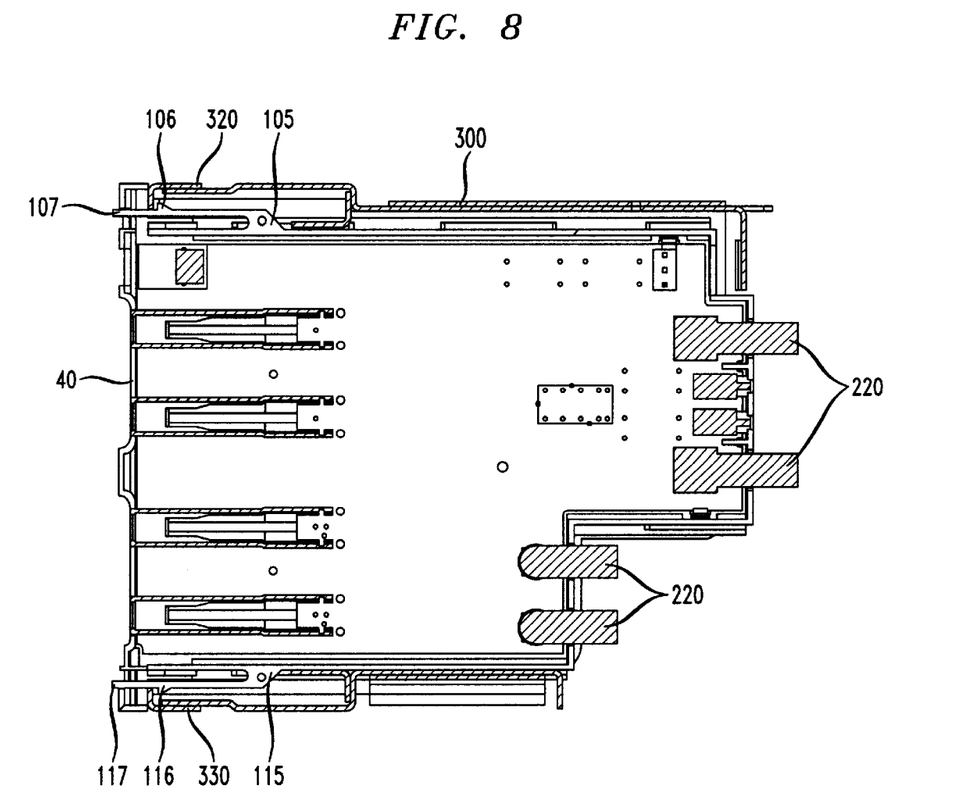
FIG. 8 is a cross-sectional view of the panel shown in FIG. 7.

FIG. 8 is a cross-sectional view showing the locking mechanism of the panel 300. The tracks 310 of the panel 300 include a protrusion 320, 330 which is directed towards the interior of the panel 300. The protrusions engage a ramped portion 106, 116 of the tabs 105, 115 to lock the module 10 in place. As the module 10 is being inserted into the panel 300, the ramped portions 106, 116 of the tabs 105, 115 slide across the protrusions 320, 330 until the ramped portions 106, 116 completely pass by the protrusions 320, 330. While the ramped portions 106, 116 are sliding across the protrusions 320, 330, the tabs 105, 115 are deformed radially inwardly (i.e. towards connectors 220) until the ramped portions 106, 116 completely pass by the protrusions 320, 330, at which point the tabs resume their original undeformed shape as shown in FIG. 8. If a operator attempts to remove the module 10 from the panel 300, the ramped portions 106, 116 of the tabs 105, 115 will prevent removal. In order to remove the module 10, an operator must grasp the portions 107, 117 of the tabs 105, 115 which extend from the front panel 40 of the module 10 and deform them radially inwardly while at the same time pulling outwardly on the module. By deforming the portions 107, 117, the operator allows the ramped portions 106, 116 to pass beneath the protrusions 320, 330, and the module 10 is easily removed.

Although the invention has been described in terms of an exemplary embodiment, it is not limited thereto. Rather, the appended claims should be construed broadly, to include other variants and embodiments of the invention which may be made by those skilled in the art without departing from the scope and range of equivalents of the invention.

What is claimed is:

1. A coaxial jack module housing comprising:
    a first portion, said first portion including at least two elongate slots formed on its outer periphery; and,
    a second portion including a main wall, a top wall and a bottom wall, said top and bottom walls disposed in an orthogonal relationship to said main wall, said second portion including at least one tab formed on each of the top and bottom walls, said tabs each including an elongate portion and a ramped portion, wherein said elongate portion and said ramped portion both extend in a direction parallel to the top, bottom and main walls,
    wherein the at least two slots cooperate with the at least two tabs to connect the first and second portions to one another.

2. The coaxial jack module housing of claim 1, wherein the first portion includes a front panel with a plurality of openings formed therein, and the second portion includes a rear panel with a plurality of openings formed therein.

3. The coaxial jack module housing of claim 1, wherein the first portion includes a main wall, a top wall and a bottom wall, said top and bottom walls disposed in an orthogonal relationship to said main wall.

4. The coaxial jack module housing of claim 3, wherein the at least two slots are formed one in each one of the top and bottom walls and extend substantially the entire length of the top and bottom walls.

5. The coaxial jack module housing of claim 3, wherein a plurality of support pins are formed on an inner surface of said main wall of said first portion.

6. The coaxial jack module housing of claim 1, wherein the top and bottom walls each have a locking tab extending therefrom.

7. The coaxial jack module housing of claim 1, wherein the at least two slots allow the second portion to be slidably engaged with the first portion.

8. The coaxial jack module housing of claim 1, wherein each of the slots comprise two walls separated by a specified distance.

9. The coaxial jack module housing of claim 8, wherein one of the walls includes at least one protrusion extending therefrom, so that a ramped portion of each of the tabs engages the protrusion.

10. The coaxial jack module housing of claim 1, further comprising a latch extending from the first portion for holding a printed circuit board.

11. The coaxial jack module housing of claim 2, further comprising a plurality of coaxial connectors disposed in alignment with the openings formed in the front and rear panels.

12. The coaxial jack module housing of claim 1, wherein the first and second portions are made of plastic.

13. A digital signal cross-connect module for a telecommunications network comprising:
    a printed circuit board;
    a first housing portion, said first housing portion including at least two elongate slots formed on its outer periphery; and,
    a second portion including a main wall, a top wall and a bottom wall, said top and bottom walls disposed in an orthogonal relationship to said main wall, said second portion including at least one tab formed on each of the top and bottom walls, said tabs each including an elongate portion and a ramped portion, wherein said elongate portion and said ramped portion both extend in a direction parallel to the top, bottom and main walls,
    wherein the at least two slots cooperate with the at least two tabs to connect the first and second housing portions to form a housing and enclose the printed circuit board within the housing.

14. The module of claim 13, wherein the first housing portion includes a front panel with a first plurality of openings formed therein, and the second housing portion includes a rear panel with a second plurality of openings formed therein.

15. The module of claim 14, wherein the printed circuit board further comprises first and second pluralities of coaxial jacks mounted on different portions of a surface thereof, said first plurality of jacks corresponding to the first plurality of openings and said second plurality of jacks corresponding to the second plurality of openings.

16. The module of claim 13, wherein the at least two slots allow the second housing portion to be slidably engaged with the first housing portion.

17. The module of claim 13, wherein each of the slots comprise two walls separated by a specified distance.

18. The module of claim 17, wherein one of the walls includes at least one protrusion extending therefrom, so that a ramped portion of each of the tabs engages the protrusion.

19. The module of claim 13, wherein the top and bottom walls each have a locking tab extending therefrom.

20. The module of claim 13, wherein the first housing portion includes a main wall, a top wall and a bottom wall, said top and bottom walls disposed in an orthogonal relationship to said main wall.

21. The module of claim 20, wherein the at least two slots are formed one in each one of the top and bottom walls.

22. The module of claim 13, wherein the first housing portion includes a main wall, a top wall and a bottom wall, said top and bottom walls disposed in an orthogonal relationship to said main wall.

23. The module of claim 22, wherein the at least two slots are formed one in each one of the top and bottom walls and extend substantially the entire length of the top and bottom walls.

24. The module of claim 1, wherein the first and second housing portions are made of plastic.

25. A telecommunications panel comprising:
    a panel having a plurality of slots formed therein;
    at least one digital signal cross-connect module adapted to be inserted in one of the plurality of slots, said module comprising a printed circuit board; a first housing portion, said first housing portion including at least two elongate slots formed around its outer periphery; and,
    a second housing portion including a main wall, a top wall and a bottom wall, said top and bottom walls disposed in an orthogonal relationship to said main wall, said second housing portion including at least one tab formed on each of the top and bottom walls, said tabs each including an elongate portion and a ramped portion, wherein said elongate portion and said ramped portion both extend in a direction parallel to the top, bottom and main walls, wherein the at least two slots cooperate with the at least two tabs to connect the first and second housing portions to form a housing and enclose the printed circuit board within the housing.

26. The telecommunications panel of claim 25, wherein the top and bottom walls each have a locking tab extending therefrom.

27. The telecommunications panel of claim 26, wherein the locking tab engages a locking member formed in slots of the panel.

28. The telecommunications panel of claim 25, wherein the first housing portion includes a main wall, a top wall and a bottom wall, said top and bottom walls disposed in an orthogonal relationship to said main wall.

29. The telecommunications panel of claim 25, wherein the at least two slots are formed one in each one of the top and bottom walls and extend substantially the entire length of the sidewalls.

30. The telecommunications panel of claim 25, wherein the first and second housing portions are made of plastic.

* * * * *